(12) United States Patent
Ahmed et al.

(10) Patent No.: US 9,870,390 B2
(45) Date of Patent: Jan. 16, 2018

(54) SELECTING FROM OR-EXPANSION STATES OF A QUERY

(71) Applicant: Oracle International Corporation, Redwood Shores, CA (US)

(72) Inventors: Rafi Ahmed, Fremont, CA (US); Nirav Vyas, Bangalore (IN); Mohamed Zait, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 455 days.

(21) Appl. No.: 14/183,409

(22) Filed: Feb. 18, 2014

(65) Prior Publication Data

US 2015/0234888 A1 Aug. 20, 2015

(51) Int. Cl.
*G06F 17/30* (2006.01)

(52) U.S. Cl.
CPC .. *G06F 17/30395* (2013.01); *G06F 17/30451* (2013.01)

(58) Field of Classification Search
None
See application file for complete search history.

(56) References Cited

U.S. PATENT DOCUMENTS

| | | |
|---|---|---|
| 4,769,772 A | 9/1988 | Dwyer |
| 4,829,427 A | 5/1989 | Green |
| 5,091,852 A | 2/1992 | Tsuchida et al. |
| 5,325,525 A | 6/1994 | Shan et al. |
| 5,339,429 A | 8/1994 | Tanaka et al. |
| 5,412,804 A | 5/1995 | Krishna |
| 5,437,032 A | 7/1995 | Wolf et al. |
| 5,452,468 A | 9/1995 | Peterson |
| 5,495,419 A | 2/1996 | Rostoker et al. |
| 5,495,605 A | 2/1996 | Cadot |
| 5,495,606 A | 2/1996 | Borden et al. |

(Continued)

OTHER PUBLICATIONS

Bergsten, et al., "Prototyping DBS3 a Shared-Memory Parallel Database System", IEEE 818622954, 226-234, 1991, pp. 226-234.

(Continued)

*Primary Examiner* — Jau-Shya Meng
(74) *Attorney, Agent, or Firm* — Hickman Palermo Becker Bingham LLP

(57) ABSTRACT

Methods, stored instructions, and computer systems are described for selecting an OR-expansion state of a query. A query processor accesses a certain query and a control parameter. The certain query comprises disjunctive predicates, and the control parameter indicates a certain procedure of a plurality of alternative stored procedures for expanding queries comprising disjunctive predicates into semantically equivalent candidate queries comprising combinations of subqueries. Based at least in part on the control parameter, the query processor selects the certain procedure to expand the certain query into one or more certain semantically equivalent candidate queries, each comprising a different combination of two or more subqueries. The query processor causes cost-based evaluation of subject queries, including the certain query and the one or more certain semantically equivalent candidate queries. The query processor then selects a query of the subject queries for execution or for further evaluation or transformation.

28 Claims, 3 Drawing Sheets

(56) References Cited

U.S. PATENT DOCUMENTS

| | | | |
|---|---|---|---|
| 5,537,588 A | 7/1996 | Engelmann et al. | |
| 5,548,755 A | 8/1996 | Leung et al. | |
| 5,551,027 A | 8/1996 | Choy et al. | |
| 5,574,900 A | 11/1996 | Huang et al. | |
| 5,588,150 A | 12/1996 | Lin et al. | |
| 5,590,319 A | 12/1996 | Cohen et al. | |
| 5,590,324 A | 12/1996 | Leung et al. | |
| 5,642,515 A | 6/1997 | Jones et al. | |
| 5,675,791 A | 10/1997 | Bhide et al. | |
| 5,680,547 A | 10/1997 | Chang | |
| 5,710,915 A | 1/1998 | McElhiney | |
| 5,724,570 A | 3/1998 | Zeller et al. | |
| 5,787,251 A | 7/1998 | Hamilton et al. | |
| 5,797,136 A | 8/1998 | Boyer et al. | |
| 5,822,748 A | 10/1998 | Cohen et al. | |
| 5,832,477 A | 11/1998 | Bhargava et al. | |
| 5,857,180 A | 1/1999 | Hallmark et al. | |
| 5,905,981 A | 5/1999 | Lawler | |
| 5,918,225 A | 6/1999 | White et al. | |
| 5,924,088 A | 7/1999 | Jakobsson et al. | |
| 5,963,932 A | 10/1999 | Jakobsson et al. | |
| 5,974,408 A | 10/1999 | Cohen et al. | |
| 6,009,265 A | 12/1999 | Huang et al. | |
| 6,026,394 A | 2/2000 | Tsuchida et al. | |
| 6,032,143 A | 2/2000 | Leung et al. | |
| 6,044,378 A | 3/2000 | Gladney | |
| 6,061,676 A | 5/2000 | Srivastava et al. | |
| 6,289,334 B1 | 9/2001 | Reiner et al. | |
| 6,298,342 B1 | 10/2001 | Graefe et al. | |
| 6,339,768 B1 | 1/2002 | Leung et al. | |
| 6,370,524 B1 | 4/2002 | Witkowski | |
| 6,430,550 B1 | 8/2002 | Leo et al. | |
| 6,438,558 B1 | 8/2002 | Stegelmann | |
| 6,438,562 B1 | 8/2002 | Gupta et al. | |
| 6,529,896 B1 | 3/2003 | Leung et al. | |
| 6,529,901 B1 | 3/2003 | Chaudhuri et al. | |
| 6,535,874 B2 | 3/2003 | Purcell | |
| 6,510,422 B1 | 7/2003 | Galindo-Legaria et al. | |
| 6,622,138 B1 | 9/2003 | Bellamkonda et al. | |
| 6,684,203 B1 | 1/2004 | Waddington et al. | |
| 6,694,306 B1 | 2/2004 | Nishizawa et al. | |
| 6,792,420 B2 | 9/2004 | Chen et al. | |
| 6,801,905 B2 | 10/2004 | Andrei | |
| 6,901,405 B1 | 5/2005 | McCrady et al. | |
| 6,934,699 B1 | 8/2005 | Haas et al. | |
| 6,941,360 B1 | 9/2005 | Srivastava et al. | |
| 6,954,776 B1 | 10/2005 | Cruanes et al. | |
| 6,961,729 B1 | 11/2005 | Toohey et al. | |
| 6,980,988 B1 | 12/2005 | Demers et al. | |
| 6,990,503 B1 | 1/2006 | Luo et al. | |
| 7,031,956 B1 | 4/2006 | Lee et al. | |
| 7,072,896 B2 | 7/2006 | Lee et al. | |
| 7,089,225 B2 | 8/2006 | Li et al. | |
| 7,146,360 B2 | 12/2006 | Allen et al. | |
| 7,167,852 B1 | 1/2007 | Ahmed et al. | |
| 7,246,108 B2 | 7/2007 | Ahmed | |
| 7,440,935 B2 | 10/2008 | Day et al. | |
| 2001/0047372 A1 | 11/2001 | Gorelik et al. | |
| 2002/0038313 A1 | 3/2002 | Klein et al. | |
| 2002/0138376 A1 | 9/2002 | Hinkle | |
| 2003/0120825 A1 | 6/2003 | Avvari et al. | |
| 2003/0167258 A1 | 9/2003 | Koo et al. | |
| 2004/0006574 A1* | 1/2004 | Witkowski | G06F 17/30333 |
| 2004/0068509 A1 | 4/2004 | Garden et al. | |
| 2004/0068696 A1 | 4/2004 | Seyrat et al. | |
| 2004/0143791 A1 | 7/2004 | Ito et al. | |
| 2004/0148278 A1 | 7/2004 | Milo et al. | |
| 2004/0167904 A1 | 8/2004 | Wen et al. | |
| 2004/0220911 A1 | 11/2004 | Zuzarte et al. | |
| 2004/0220923 A1 | 11/2004 | Nica | |
| 2004/0267760 A1 | 12/2004 | Brundage et al. | |
| 2004/0268305 A1 | 12/2004 | Hogg et al. | |
| 2005/0033730 A1 | 2/2005 | Chaudhuri et al. | |
| 2005/0055382 A1 | 3/2005 | Ferrat et al. | |
| 2005/0076018 A1 | 4/2005 | Neidecker-Lutz | |
| 2005/0149584 A1 | 7/2005 | Bourbonnais et al. | |
| 2005/0187917 A1 | 8/2005 | Lawande et al. | |
| 2005/0198013 A1 | 9/2005 | Cunningham et al. | |
| 2005/0210010 A1 | 9/2005 | Larson et al. | |
| 2005/0234965 A1 | 10/2005 | Rozenshtein et al. | |
| 2005/0278289 A1 | 12/2005 | Gauweiler et al. | |
| 2005/0278616 A1 | 12/2005 | Eller | |
| 2005/0283471 A1 | 12/2005 | Rafi | |
| 2005/0289125 A1 | 12/2005 | Liu et al. | |
| 2006/0026115 A1 | 2/2006 | Ahmed | |
| 2006/0026133 A1 | 2/2006 | Ahmed | |
| 2006/0041537 A1* | 2/2006 | Ahmed | G06F 17/3097 |
| 2006/0167865 A1 | 7/2006 | Andrei | |
| 2006/0168513 A1 | 7/2006 | Coulson et al. | |
| 2007/0027880 A1 | 2/2007 | Dettinger et al. | |
| 2007/0044012 A1 | 2/2007 | Suver et al. | |
| 2007/0073643 A1 | 3/2007 | Ghosh et al. | |
| 2007/0179947 A1 | 8/2007 | Ahmed et al. | |
| 2007/0219951 A1 | 9/2007 | Ahmed et al. | |
| 2007/0219952 A1 | 9/2007 | Ahmed et al. | |
| 2007/0219969 A1 | 9/2007 | Su et al. | |
| 2007/0219977 A1 | 9/2007 | Su et al. | |
| 2008/0010240 A1 | 1/2008 | Zait | |
| 2008/0077606 A1 | 3/2008 | Fang et al. | |
| 2012/0047158 A1* | 2/2012 | Lee | G06F 17/30469 707/759 |
| 2015/0149440 A1* | 5/2015 | Bornea | G06F 17/30442 707/719 |

OTHER PUBLICATIONS

Bhide, Anupam, "An Analysis of Three Transaction Processing Architectures", Computer Science Division, UC Berkeley, Proceeding of the 14th VLDB Conference,1998, pp. 339-350.

Copeland, George et al., "Data Placement in Bubba," ACM 0897912683, 1988, pp. 99-108.

Dayal, Umeshwar, "Of Nests and Trees: A Unified Approach to Processing Queries That Contain Nested Subqueries, Aggregates and Quantifiers", Proceedings of the 13th VLDB Conference, Brighton 1987, pp. 197-208.

Dewitt, et al., "A Performance Analysis of the Gamma Database Machine," Computer Sciences Department, University of Wisconsin, 1988, pp. 350-360.

Englert, Susan et al., "A Benchmark of NonStop SQL Release 2 Demonstrating Near-Linear Speedup and Scaleup on Large Databases", Technical Report 89.4, Tandem Part No. 27469, May 1989, pp. 1-23.

Graefe, Goetz, "Encapsulation of Parallelism in the Volcano Query Processing System," Mar. 1990, pp. 102-111.

Hirano, et al., "Load Balancing Algorithm for Parallel Processing on Shared Memory Multiprocessor", IEEE, pp. 210-217, 1991.

Hong, et al., "Optimization of Parallel Query Execution Plans in XPRS", Proceedings of the First International Conference on Parallel and Distributed Information Systems, IEEE, 1991, pp. 218-225.

Leverenz et al., "Oracle 8i Concepts Release 8.1.5- A67781-01", Oracle Corporation, Feb. 1999, located on the internet at <http://www.csee.umbc.edu/help/oracle8/server.815/a67781/toc.htm> 122 pages.

Lumpkin, George et al., "Query Optimization in Oracle 9i", Oracle Corporation, Oracle White Paper, Feb. 2002, pp. 1-30.

Pirahesh, Hamid, et al., "Extensible/Rule Base Query Rewrite Optimization in Starburst", IBM Almaden Research Center.

Selinger, P. Griffiths, et al., "Access Path Selection in a Relational Database Management System", Proceedings of the 1979 ACM SIGMOD International Conference on the Management of Data, 1979, pp. 23-34.

Stonebraker, Michael, et al. "The Design of XPRS," Proceedings of the 14th VLDB Conference, 1988, pp. 318-330.

Tandem, "A Benchmark of NonStop SQL on the Debit Credit Transaction", The Tandem Performance Group, 1988, pp. 337-341.

Chen, et al., "View merging in the context of view selection changing", Database Engineering and Applications Symposium 2002, Proceedings, Jul. 2002.

(56) References Cited

OTHER PUBLICATIONS

Praveen Seshadri et al. Cost-Based Optimization for Magic: Algebra and Implementation. SIGMOD Jun. '96. ACM 1996.
M. Muralikrishna. Improved Unnesting Algorithms for Join Aggregate SQL Queries. 18th VLDB Conference. Canada, 1992.
Deutsch, Alin et al., "Minimization and Group-By Detection for Nested XQueries", University of California, San Diego, 2003, 15 pages.
Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.
Chaudhuri, Surajit, "An Overview of Query Optimization in Relational Systems", Microsoft Research, 1998, 10 pages.
Hayu, John, "Analytic SQL Features in Oracle9i", An Oracle Technical White Paper, Dec. 2001, 32 pages.
Oracle, "Optimizer Modes, Plans Stability, and Hints", Oracle8i Tuning Release 8.1.5 A67775-01, Oracle Website, 1999, 54 pages.
Gail Erickson, author. Microsoft TechNet. Improving Performance with SQL Server 2000 Indexed Views. Microsoft Corp. Sep. 2000.
Cesar Galindo-Legaria & Arnon Rosenthal. Outerjoin Simplification and Reordering for Query Optimization. ACM 1997.
Oracle, "Oracle 9I Database Documentation", Oracle, Parts A96670-01, A96674-01, A96673-02, 2002, 833 pages.
Fitzgerald et al., "Special Edition Using Crystal Reports IO", Que, Chapters 23, 24, 27, 35, Appendix A, Jul. 14, 2004, 170 pages.
Rankins et al., "Microsoft SQL Server 2000 Unleashed," Second Edition, Sams, Chapters 3, 4, 5, 6, 36, Dec. 18, 2002, 109 pages.
Li, C. et al., "Minimizing View Sets without Losing Query-Answering Power" 2001, Springer, pp. 99-113.
Mumick, I. et al., "Maintenance of Data Cubes and Summary Tables in a Warehouse", ACM 1997, pp. 100-111.
Rafi Ahmed, "Affidavit of Rafi Ahmed", dated Feb. 8, 2010, 3 pages.
Response to Office Action, U.S. Appl. No. 11/237,040, dated Feb. 10, 2010, 20 pages.
Rafi Ahmed et al., "Cost-Based Query Transformation in Oracle," Copyright 2006 VLDB, ACM 1595933859, pp. 1026-1036.
Surajit Chaudhuri et al. Including Group-by in Query Optimization. Hewlett-Packard Laboratories. 20$^{th}$ VLDB Conference. Chile, 1994.
Priti Mishra et al. Join Processing in Relational Databases. ACM Computing Surveys. Mar. 1992.
U.S. Appl. No. 11/716,126, filed Mar. 8, 2007, Office Action, dated Apr. 3, 2009.
U.S. Appl. No. 11/716,126, filed Mar. 8, 2007, Notice of Allowance, dated Nov. 18, 2009.

* cited by examiner

SELECTING FROM OR-EXPANSION STATES OF A QUERY

CROSS-REFERENCE TO RELATED APPLICATIONS AND MATERIALS

This application is related to U.S. Pat. No. 7,702,627, entitled "EFFICIENT INTERACTION AMONG COST-BASED TRANSFORMATIONS," filed on Mar. 8, 2007, by Rafi Ahmed and Allison Lee, the contents of which is hereby incorporated by reference herein in its entirety. This application is also related to U.S. Pat. No. 7,246,108, entitled "REUSING OPTIMIZED QUERY BLOCKS IN QUERY PROCESSING," filed Jul. 27, 2004, by Rafi Ahmed, the contents of which are incorporated by reference herein in its entirety. This application is also related to U.S. Pat. No. 7,644,062, entitled, "JOIN FACTORIZATION OF UNION/UNION ALL QUERIES," filed Mar. 8, 2007, by Hong Su, Rafi Ahmed, Allison Lee, Mohamed Zait, and Thierry Cruanes, the contents of which is incorporated by reference herein in its entirety. This application is also related to "Elements of the Theory of Computation," H. R. Lewis and C. H. Papadimitriou, 2d ed. 1998, the contents of which is hereby incorporated by reference herein in its entirety.

TECHNICAL FIELD

The technical field relates to query transformation and optimization.

BACKGROUND

Query Processing

A query is an expression, command, or set of commands that, when executed, causes a server to perform an operation on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects.

A table is an example database object that stores data in column(s) and row(s). A view is a database object that is defined by an expression, such as a subquery, that references other data object(s), such as table(s). Tables, views, or other data objects may be instantiated from within a query by referencing the data object in the FROM clause. Instantiating a data object in a query causes the data object to be assigned a reference name, such as "T1," "T2," or "EMPLOYEES" for a table, and causes data from the data object to be loaded, often into working memory, for further processing by other operation(s) in the query.

A subquery contains its own SELECT, FROM, and optionally other clauses, and the subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

The query may perform operations on data from the source data object(s) on a row-by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

Example operations that may be performed on the source data object(s) include, but are not limited to operations represented by syntactical clauses, such as, WHERE, GROUP BY, HAVING, SELECT, and ORDER BY. A query processor may evaluate separate operations of the query in a predictable order. For example, the order of precedence may be FROM, WHERE, GROUP BY, HAVING, SELECT, and ORDER BY. Query processors may vary the order if varying the order is predicted to be more efficient as long as the varying the order would not change a result of the query.

Logical Combinations of Predicates

Predicate(s) may appear in the WHERE clause to exclude rows that do not satisfy conditions specified in the predicate(s). The predicate(s) are typically evaluated on a row-by-row basis for each row in the source(s) of the query, which may be specified in the FROM clause of the query. For example, a predicate may remove, exclude, or filter out rows for employees from an employee table that are not in the "marketing" department. The conditions in a predicate may include equality, inequality, or other comparison operators that evaluate to TRUE, FALSE, or UNKNOWN. Example operators in conditions may include, but are not limited to, equals, greater than, less than, greater than or equal to, less than or equal to, is null, is not null, is not equal to, and the case operator.

Conditions in predicate(s) may be related to each other with logical operators such as AND (for "conjunctive predicates") or OR (for "disjunctive predicates"). The "AND" operators connects two predicates to form a complex predicate that is satisfied when both of the connected predicates are satisfied. The "OR" operator connects two predicates to form a complex predicate that is satisfied when either or both of the connected predicates are satisfied.

Further, subset(s) of the predicates may appear inside of parenthesis, indicating that these subset(s) are to be processed together, and results of these subsets are to be AND-ed or OR-ed with other predicates that appear outside of the parenthesis. Subset(s) of predicates may be nested inside one or more layers of parentheses, and these layers further complicate the logic that is to be applied for each row of the source(s) for the query.

Predicates and logical combinations of predicates may be negated by the "NOT" operator. For example, an operator or combination thereof that would have returned "TRUE" would instead return "FALSE," and vice versa, if modified by the "NOT" operator.

Query Optimization

In query optimization, a query optimizer or other query processor may transform queries from one form to another form as long as the two forms are semantically equivalent to each other. Typically, query optimization involves rewriting a first query expression, such as a first SQL query, to a second, different but semantically equivalent, query expression, such as a second SQL query, and then generating an execution plan for the second query expression. An execution plan is a set of directives, which includes table access paths, join permutations, join methods, etc., that is prepared for an execution engine. The directives of an execution plan are low-level instructions that reference particular data structures and a particular order of operations for accomplishing the tasks or operations indicated by a corresponding query expression.

As used herein, a query is considered "transformed" during query optimization when the query is (a) rewritten from a first expression or representation to a second expression or representation, (b) received in a manner that specifies or indicates a first set of operations, such as a first expression, representation, or execution plan, and executed using a second set of operations, such as the operations specified by or indicated by a second expression, representation, or execution plan, or (c) received in a manner that specifies or indicates a first set of operations, and planned for execution using a second set of operations. Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by the query or execution plan, if executed.

OR-Expansion

The optimizer may perform a transformation called OR-expansion. OR-expansion involves transforming an initial query that includes at least a first predicate and a second predicate logically combined by an OR operator. The initial query is transformed into a transformed query that uses a UNION ALL operator to combine a first subquery or query block including the first predicate with a second subquery or query block including the second predicate. The UNION ALL combines result sets from the subqueries. These subqueries are also referred to as the branches of the UNION ALL query. Because the UNION ALL operator does not eliminate duplicate values, if the first subquery and second subquery could have overlapped in resulting row(s), the transformed query may also add a condition to the second subquery that excludes common resulting row(s) from the first subquery. Breaking up disjunctive predicates may open up new access paths and join methods.

For example, the optimizer may transform example Query 1, which includes disjunctive predicates, into example Query 2, which combines subqueries using the UNION ALL operator.

Example Query 1

SELECT *
FROM T1, T2
WHERE T1.x=10 OR T2.y=20;

The disjunctive predicates, "T1.x=10" and "T2.y=20," are each assigned to their own subquery as example Query 1 is transformed into example Query 2. Example Query 2 also uses the LNNVL operator to exclude, from results of one subquery, potential duplicates from results of the other subquery. The LNNVL operator operates on a condition and returns TRUE if the condition is FALSE (for example, given that a=2, the condition a=3) or UNKNOWN (for example, when a NULL value is compared using an equality operator) and FALSE if the condition is TRUE (for example, given that a=2, the condition a=2). In the example, the LNNVL operator is equivalent to T1.x < >10 or T1.x IS NULL. The NOT IN and NOT EQUAL TO operators are similar to LNNVL, but with potentially different treatment for NULL values.

Example Query 2

SELECT *
FROM T1, T2
WHERE T1.x=10
UNION ALL
SELECT *
FROM T1, T2
WHERE T2.y=20 AND LNNVL (T1.x=10).

As shown, example Query 2 places the first predicate, "T1.x=10," in a first subquery, "SELECT * FROM T1, T2 WHERE T1.x=10," and the second predicate, "T2.y=20," in a second subquery, "SELECT * FROM T1, T2 WHERE T2.y=20 AND LNNVL (T1.x=10)."

Because the optimizer performs query transformation functions to prepare for query execution rather than actually starting execution of the queries, optimizer functionality is generally bound by a highly limited amount of time and computing resources. Additionally, queries may be transformed in virtually an unlimited number of ways. If the optimizer was not bounded by time and resources, then database servers would spend too much time and resources preparing for execution without ever actually accomplishing any work. For this reason, optimizers may choose a sub-optimal transformation or even no transformation without ever finding the best possible transformation for a given query. Due to these time and resource constraints, queries with complex logical combinations of predicates often go un-optimized or are transformed sub-optimally. Nonetheless, even sub-optimal query transformations may cause significant improvements over the initial query during query execution.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
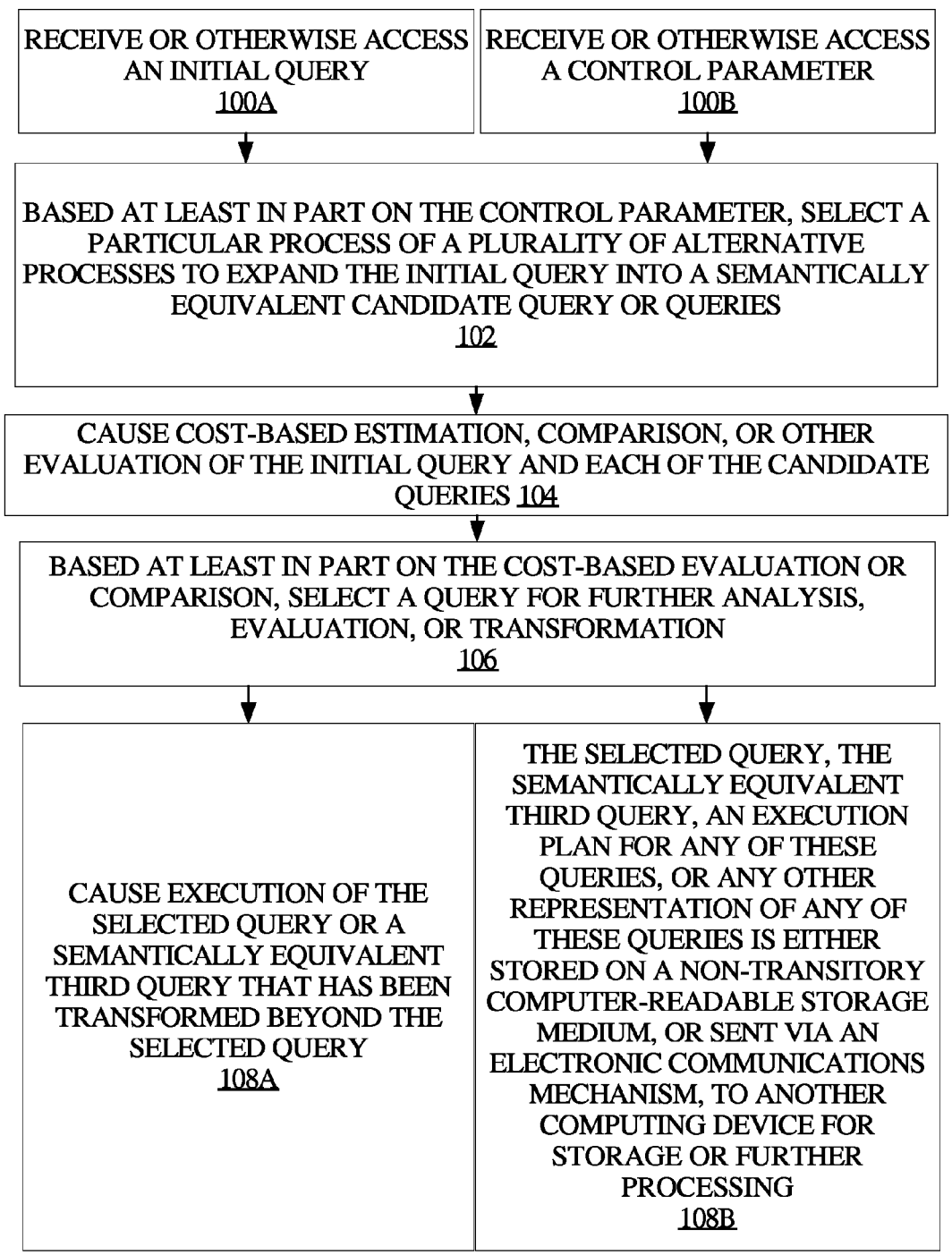
FIG. 1 illustrates an example process for selecting an OR-expansion state for a query.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods, stored instructions, and computer systems are provided for selecting an OR-expansion state of a query. In one embodiment, a query processor operating on one or more computing devices accesses a certain query and a control parameter. For example, the query may be received from a client or may be otherwise retrieved from storage. The certain query comprises two or more disjunctive predicates, and the control parameter indicates a certain procedure of a plurality of alternative stored procedures for expanding queries comprising disjunctive predicates into semantically equivalent candidate queries comprising combinations of subqueries. Each stored procedure is a set, class, or group of instructions that is configured to take a unique approach for exploring OR-expansion states of a query and which may result in exploring different OR-expansion states for the same query. The control parameter may be specified in the certain query or with the certain query, or may be stored in association with the certain query or with query execution more generally.

Based at least in part on the control parameter, the query processor selects, from the plurality of alternative procedures for expanding queries, the certain procedure to expand the certain query into one or more certain semantically equivalent candidate queries. Each of the certain semantically equivalent candidate queries comprises a different combination of two or more subqueries.

The query processor causes estimation, comparison, or other evaluation of approximately how efficiently the subject queries could be executed, including the certain query and each of the certain semantically equivalent candidate queries that resulted from applying the certain procedure to the certain query. This cost-based evaluation is different than query execution. The cost-based evaluation is done by a query processor before the query is executed by an execution engine of a database server. When the query cost is evaluated, execution costs or other query execution efficiencies are estimated for different representations of the query, and a preferred representation of the query is selected for execution. The evaluation does not cause the query to be performed or query results to be generated, but the execution does cause the query to be performed against stored data and likely causes results to be generated.

Based at least in part on the cost-based evaluation, the query processor selects a particular query of the subject queries. In one example, the cost-based evaluation accounts for estimates of the numbers of rows that would be processed by each of the subject queries, and the least cost query may be selected for execution. Queries may be compared to each other using an efficiency estimation metric, resulting in selection of the query with the best efficiency estimation metric.

The query processor then causes execution of a transformed query that is based at least in part on the selected query. For example, the transformed query may be the selected query itself or may be a further transformation or alternative representation of the selected query. Alternatively, the query processor may select multiple candidate queries and/or further transformations for further cost-based evaluation and, upon further cost-based evaluation, select one of the queries for execution.

In one embodiment, an initial query is converted into a disjunctive normal form such that disjunctions of the query may be more efficiently represented as units. A disjunctive normal form (DNF) is a standardization (or normalization) of a logical formula into a simplified form that is a disjunction of predicates, which may include individual predicates or conjunctive predicates. All logical formulas with any levels of ANDs and ORs can be converted into DNF. A certain OR-expansion strategy or stored procedure may be selected from among the plurality of alternative strategies or stored procedures for expanding queries comprising disjunctive predicates into semantically equivalent candidate queries comprising combinations of UNION-ALL subqueries. These alternative strategies or stored procedures may also be referred to herein as alternative OR-expansion techniques.

The certain technique may be used to explore OR-expansion states systematically and in a different manner than others of the alternative techniques. The collection of all possible OR-expansion states for a given query is referred to herein as the OR-expansion state space, and each state in the state space represents a different combination of subqueries combined by UNION ALL operator(s). The certain technique can be used to search the OR-expansion state space exhaustively when required, and is able to determine a most optimal execution plan for OR-expansion or at least systematically determine an execution plan with a predictable likelihood of optimality and with knowledge of how many states were ignored by the OR-expansion technique.

FIG. 1 illustrates an example process for selecting an OR-expansion state for a query. In the example, a query processor receives or otherwise accesses an initial query in step 100A. A query processor receives or otherwise accesses a control parameter in step 100B, which may be performed before, after, or concurrently with step 100A. The initial query includes disjunctive predicates, and the control parameter indicates a certain procedure of a plurality of alternative procedures that is to be used for expanding queries comprising disjunctive predicates into semantically equivalent candidate queries comprising combinations of UNION-ALL subqueries. In step 102, based at least in part on the control parameter, the query processor selects the certain procedure to expand the initial query into a semantically equivalent candidate query or queries. Each of the semantically equivalent candidate queries comprises a different combination of subqueries. In step 104, the query processor causes a cost-based estimation, comparison, or other evaluation of the initial query and each of the candidate queries. In step 106, based at least in part on the cost-based evaluation, the query processor selects, for execution or further analysis, cost-based evaluation, or transformation, a particular query of the candidate queries or the initial query.

In step 108A, execution is caused for the selected query or for a semantically equivalent third query that has been transformed beyond the selected query. For example, the selected query, the semantically equivalent third query, or an execution plan for any of these queries, or any other representation of any of these queries may be executed by the query processor or may be sent to an execution engine for execution. In step 108B, which may be performed instead of or in addition to step 108A, the selected query, the semantically equivalent third query, an execution plan for any of these queries, or any other representation of any of these queries is either stored on a non-transitory computer-readable medium, or sent, via an electronic communications mechanism, to another computing device for storage or further processing.

Figure 2:
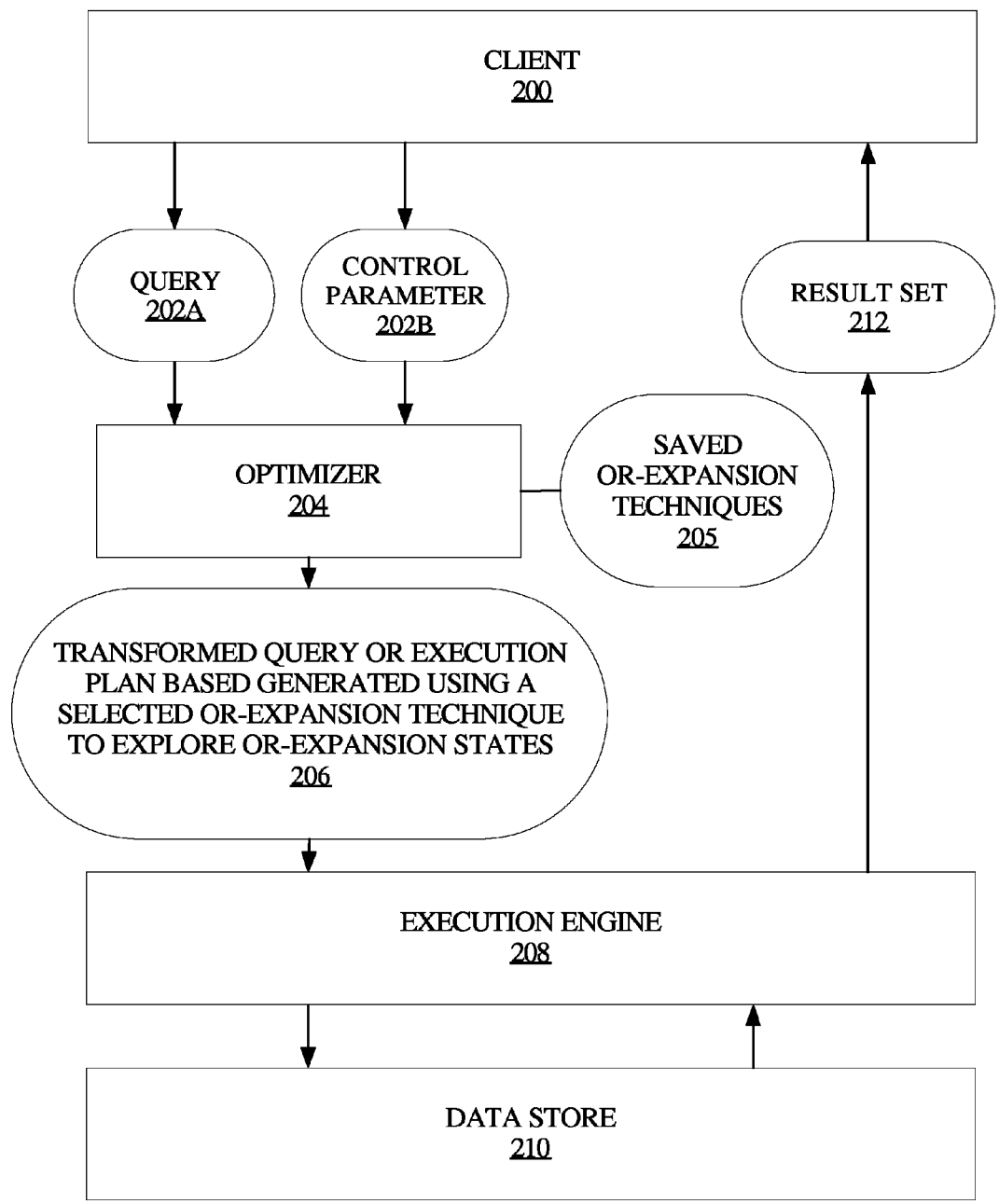
FIG. 2 illustrates an example server-client system for transforming and executing a query.

FIG. 2 illustrates an example server-client system for transforming and executing a query. In the example, client 200 sends a query 202A and a control parameter 202B to optimizer 204. As shown, optimizer 204 is separate from execution engine 208. Optimizer 204 and execution engine 208 may operate on same or different devices and may have a high amount or low amount of integration with each other. Optimizer 204 selects an OR-expansion technique of saved OR-expansion techniques 205 and generates a transformed query or execution plan using the selected OR-expansion technique to explore OR-expansion states. Optimizer sends the transformed query or execution plan 206 to execution engine 208. Execution engine 208 then executes the transformed query or execution plan 206 against data store 210 and returns result set 212 to client 200.

A query, including instructions or commands to be executed against a database, is typically submitted by a client for execution by a database server, and, prior to execution by the database server, the query may be transformed by an optimizer or other query processor as a result of evaluating or comparing different representations of the query against each other. The query processor may then send the transformed representation to an execution engine of a database server for execution against a database.

The transformed query or execution plan is sent to a database server for execution. The transformed query may be executed against a database to access data stored in the database and/or to apply changes to the database. Execution of the query is different than cost-based evaluation of the query against other equivalent representations. When the preferred representation of the query is executed by the execution engine, the instructions or commands in the query are actually carried out against the database, and results are generated and sent back to a client that originated the query.

A database system may include multiple instances of a database server and/or multiple instances of a query processor running on top of the instance(s) of the database server. Each of these database server instances or query processor instances comprises processes that are running on one or more physical computing devices to provide database server or query processor functionality, respectively. These running processes may also be in communication with storage instances that are hosted on one or more physical storage devices to provide storage functionality and application instances that are hosted on one or more physical computing devices to provide application functionality. The database system, comprising the database server instances, query processor instances, storage instances, and application instances, may be hosted on a single computing device or across multiple computing devices, optionality with separate computing devices corresponding to separate functionality.

OR-Expansion Transformations

In OR-expansion transformations, the state space may be determined based on the number of disjunctive predicates in a subquery or query block. Queries may have filter predicates and/or join predicates in disjunction. If executing queries as-is, such predicates generally cannot be evaluated earlier while scanning the table or performing the join. In this scenario, these predicates can be evaluated only after the corresponding table has been accessed or a Cartesian product of tables has been performed. Accordingly, in the presence of large data sets, these predicates may lead to poor performance. Queries may also have a nested disjunctive predicate, and this may lead to even worse performance.

The OR-expansion transformation converts the given, potentially nested, disjunctive predicates into DNF, including broken up independent conjunctive predicates, so that they can be placed optimally in a UNION ALL query. Breaking up disjunctive predicates may open up new access paths and join methods that would otherwise be infeasible. For example, the predicates of example Query 1 may be broken up into the subqueries of example Query 2. In example Query 2, index accesses on T1.x and T2.y may be feasible even though these index accesses were not feasible in example Query 1.

The presence of multiple predicates in a disjunctive query may lead to a combinatorial explosion of possible alternatives in which the query could be transformed. Further, nested predicates may impose an order of operations that is typically followed, to preserve semantic equivalence, by the optimizer and execution engine. Nested predicates and disjunctive combinations of multiple predicates may also be OR-expanded.

Nested disjunctions are the form of predicates that have nesting of OR-ed and/or AND-ed predicates at different levels. In other words, an OR operator may modify a combination of OR-ed predicates. Example Query 3 shows a nested disjunction that, in the absence of OR expansion, would not be able to benefit from the presence of indices on individual columns.

Example Query 3

SELECT *
FROM T1
WHERE T1.a=10 AND (T1.b=20 OR (T1.c=30 AND (T1.d=40 OR T1.e=50)));

After applying the commutative property, example Query 3 is equivalent to example Query 4.

Example Query 4

SELECT *
FROM T1
WHERE (T1.a=10 AND T1.b=20) OR (T1.a=10 AND T1.c=30 AND T1.d=40) OR (T1.a=10 AND T1.c=30 AND T1.e=50);

Example Query 4 has three independent conjuncts, "T1.a=10 AND T1.b=20," "T1.a=10 AND T1.c=30 AND T1.d=40," and "T1.a=10 AND T1.c=30 AND T1.e=50," and each of these independent conjuncts may be treated separately. When a general OR-expansion technique is applied on Query 3 or 4, the OR-expansion technique may break up the disjunctive predicates, which is in DNF, into three independent conjuncts, which can now be used as index keys. Example Query 3 or example Query 4 is transformed into example Query 5.

Example Query 5

SELECT *
FROM T1
WHERE T1.a=10 AND T1.b=20
UNION ALL
SELECT *
FROM T1
WHERE T1.a=10 AND T1.c=30 AND T1.d=40 AND LNNVL(T1.a=10 AND T1.b=20)
UNION ALL
SELECT *
FROM T1
WHERE T1.a=10 AND T1.c=30 AND T1.e=50 AND LNNVL(T1.a=10 AND T1.b=20) AND LNNVL(T1.a=10 AND T1.c=30 AND T1.d=40);

As shown, example Query 5 has three branches in fully expanded form. To avoid including duplicate results in latter branches, each of the latter branches negates results from earlier branches using the LNNVL operator. In example Query 5, the filters may be used as index keys, and the overall plan performance may improve by using indexes in place of full table scan. Therefore, example Query 5 may, in some cases, be more predictably more efficient than example Query 3 or example Query 4.

In another example, Query 6 has a disjunctive predicate that may be broken up into UNION-ALL subqueries by first converting the query into DNF.

Example Query 6

SELECT *
  FROM T1, T2
  WHERE (T1.x=10 OR T2.y=20) AND T1.z=T2.z;

In the example, assume there are indexes on T1(x) and T2(y). Because the disjunctive predicate, "T1.x=10 OR T2.y=20," is in parenthesis, and in the absence of OR-expansion, the optimizer could treat the two disjunctive predicates as a single unit and apply the "AND T1.z=T2.z" to the result of the single unit. In this scenario, the optimizer would not use an execution plan that explores the index on either the T1.x or the T2.y columns. The optimizer instead would choose to do a full table scan of table T1 and T2.

Because the conjunction, "AND T1.z=T2.z" is applied to the entire disjunction of "T1.x=10 OR T2.y=20," example Query 6 is equivalent to example Query 7. In other words, a disjunction of conjunctive or individual predicates may be determined by applying the commutative property of the AND-ed predicate to the OR-ed predicates. This is an example of DNF conversion, since the predicates in Query 7 are a disjunction of conjunctive predicates.

Example Query 7

SELECT *
  FROM T1, T2
  WHERE (T1.x=10 AND T1.z=T2.z) OR (T2.y=20 AND T1.z=T2.z).

This query has two independent conjuncts, "T1.x=10 AND T1.z=T2.z," and "T2.y=20 AND T1.z=T2.z," and each of these independent conjuncts may be treated separately.

When a general OR-expansion technique is applied on Query 6 or Query 7, the OR-expansion technique breaks up the disjunctive predicates into two independent conjuncts, which can now be used as index keys. Example Query 6 or example Query 7 is transformed into example Query 8.

Example Query 8

SELECT *
  FROM T1, T2
  WHERE T1.x=10 AND T1.z=T2.z
UNION ALL
SELECT *
  FROM T1, T2
  WHERE T2.y=20 AND T1.z=T2.z AND LNNVL (T1.x=10 AND T1.z=T2.z);

In example Query 8, each filter is used as index key, and the overall plan performance may improve by using two indexes in place of full table scan. Therefore, example Query 8 may, in some cases, be more predictably more efficient than example Query 6 or example Query 7.

Example Query 9 may also benefit from OR-expansion.

Example Query 9

SELECT *
  FROM T1, PART P
  WHERE (T1.x=10 OR P.key=20);

In the example, suppose the table Part is a partitioned table on column "key" and there exists an index on T1.x. In the absence of OR-expansion, the optimizer would choose a full table scan of T1 and Part. When OR-expansion is applied, example Query 9 may be transformed into example Query 10.

Example Query 10

SELECT *
  FROM T1, PART P
  WHERE T1.x=10
UNION ALL
SELECT *
  FROM T1, PART
  WHERE P.key=20 AND LNNVL (T1.x=10);

When evaluating example Query 10, the optimizer may choose a plan that uses an index on T1.x in the first UNION ALL branch and that prunes by partition of table Part in the second UNION ALL branch.

Example Queries 11 and 12 show how OR expansion may be used to help the optimizer choose a better join method.

Example Query 11

SELECT *
  FROM T1, T2
  WHERE (T1.x=T2.x OR T1.y=T2.y);

Without OR-expansion, example Query 11 would be executed by performing a Cartesian product of T1 and T2 and then applying the disjunctive predicate, "T1.x=T2.x OR T1.y=T2.y," on the result. When the predicate in example Query 11 is broken up into individual join predicates in two different UNION ALL branches, the optimizer may apply any join method. Example Query 11, after OR-expansion, may result in example Query 12.

Example Query 12

SELECT*
  FROM T1, T2
  WHERE T1.x=T2.x
UNION ALL
SELECT*
  FROM T1, T2
  WHERE T1.y=T2.y AND LNNVL (T1.x=T2.x);

Any legal predicate can appear in a disjunction or conjunction in the where clause of the SQL statement. The optimizer may use OR-expansion transformation(s) to transform a class of queries that have disjunctive predicates into a class of queries that include separate UNION-ALL subqueries. At least some of the disjunctive predicates are broken up into independent predicates, while some of the predicates are left in the disjunctive form. The query may be rewritten as subqueries combined as branches to the UNION ALL operator. Each UNION ALL branch comprises a distinct disjunctive predicate or combination of disjunctive predicates. The UNION ALL branches may also have additional negated predicate(s), such as AND LNNVL( ) or AND NOT( ), for maintaining semantic equivalence to the original query. The negated predicate(s) allow the later branch(es) of UNION ALL operation(s) to exclude other or earlier branch(es) of the UNION ALL operation(s).

Example Cost-Based Evaluation Techniques

OR-expansion may not always lead to a query that performs better than the original query, and continued exploration of OR-expansion states may not provide queries that perform better than previously explored OR-expansion states. Therefore, OR-expansion may be done in a cost-based manner by comparing the costs of the original query and various transformed queries and by selecting the least expensive query. For example, different candidate transformations may be evaluated against each other and/or against the original query in order to determine which is the least expensive.

The estimated cost of a certain representation or transformation of a query may be based on a variety of factors, including, but not limited to: a row cardinality or number of rows that are estimated to be scanned by a query or subquery, whether or not there are indexes or cached results that can be used to determine any subset of results for a query or subquery, a number of different subqueries that are processed separately by a query or subquery, a number of rows that are joined together by a query or subquery, how much of the results would have to be maintained in memory or on disk to process a query or subquery, how much memory or disk space is available to process a query or subquery, how many processors are available to process a query or subquery, minimum, maximum, or average access costs for processing individual rows of tables, indexes, and/or cached results for a query or subquery, and/or minimum, maximum, or average costs for reading, executing, and/or storing results for a query or subquery.

In one embodiment, a query processor receives a certain query and uses an OR-expansion technique to expand the certain query into a semantically equivalent candidate query or queries. A costing mechanism, which may be built into the query processor or operate separately or independently of the query processor, may be used to estimate costs for the certain query and the semantically equivalent candidate query or queries (collectively, the subject queries). In order to estimate the costs, the query processor may provide the subject queries, one-by-one, in a group, or all-at-once, to the costing mechanism. The costing mechanism may evaluate the certain query and the semantically equivalent candidate query or queries by determining a certain cost of the certain query and, for each of the semantically equivalent candidate queries, another cost. The query processor may then select, one-by-one, in a group, or all-at-once, the query with the lowest cost of the subject queries.

In one embodiment, the query processor iteratively compares the estimated cost of each new candidate query against the estimated cost of the best cost query so far. Initially, the best cost query may be the certain query. If the candidate query has a better estimated cost than the best cost query so far, then the candidate query becomes the best cost query so far. The estimated cost of the candidate query may then be iteratively compared against other candidate queries. By comparing query-to-query, the costing mechanism does not need to store more than two estimated costs at a time, and does not need to retain more than one estimated cost after the comparison.

In one embodiment, the costing mechanism retains estimated costs of queries and subqueries to use for more efficiently estimating costs of other queries and subqueries. For example, if several different queries utilize the same subquery, then a cost of the subquery may be utilized in estimating the cost of the different queries. In another example, if a set of subqueries meets or exceeds a best cost so far, then any query with the set of subqueries may be ignored as a candidate query—such a query could not be better than the best query so far. In yet another example, when evaluating a query that includes a first set of subqueries and a second set of subqueries, the query processor may ignore the query as a candidate if the best cost so far is met or exceeded by an estimated cost of the first set of subqueries plus a minimum or maximum possible cost of the second set of subqueries, even if the costing mechanism has not yet estimated a cost for the second set of subqueries. Alternatively, the costing mechanism may roughly estimate the cost for the second set of subqueries and perform filtering before the costing mechanism has determined a finer-grained estimation for the second set of subqueries.

Example Alternative OR-Expansion Techniques

An interface or automated decision engine is provided for causing selection from among the alternative OR-expansion techniques. The alternative OR-expansion techniques may include two, three, or more of: an exhaustive search procedure, a two-pass search procedure, a linear search procedure, or a greedy search procedure. The interface or automated decision engine may allow selection from among alternative OR-expansion techniques in addition to or instead of the OR-expansion techniques mentioned herein, and the interface is not necessarily limited to supporting the mentioned techniques. The exhaustive search technique or stored procedure, two-pass search technique or stored procedure, linear search technique or stored procedure, and greedy search technique or stored procedure are further described herein to provide a depth of understanding regarding example OR-expansion techniques or stored OR-expansion procedure that could be used.

The different OR-expansion techniques may perform more differently for complex queries that have 3, 4, 5 or more disjunctive units, or more than 2-3 possible OR-expansion states, rather than simple queries such as those that have 2 disjunctive units and 2 possible OR-expansion states. The different techniques may be selected and pursued for a query to explore a predictable number of OR-expansion states of the initial query rather than recursively choosing whether to continue exploring states that may follow from a current state based on an analysis that could be performed after each transformation.

In one embodiment, the query processor selects and/or uses an OR-expansion technique with knowledge of how many or approximately how many OR-expansion states will be explored by that technique. The query processor may determine how many OR-expansions states would be explored by one or multiple techniques before a technique is selected or used. By determining how many states will be explored, the query processor may explore OR-expansion states with knowledge of how many computing resources will be required to do so. In scenarios where expanding the OR-expansion states would be prohibitively expensive or have above a threshold cost, the query processor may fall back on other techniques that explore a smaller sub-set of the possible OR-expansion states.

An OR-expansion state is a representation of a query after the query has undergone OR-expansion. A single query may undergo many different OR-expansions, resulting in many different possible OR-expansion states. A collection of all possible OR-expansion states for a query, including the no transformation state, is referred to as an OR-expansion state space for the query. The size of the state space depends on the number of disjunctive predicates once the predicates have been converted into DNF. When converted into DNF, each predicate in the disjunction may be a single predicate or a conjunction of multiple predicates. An exhaustive search for all possible OR-expansion predicates can be quite resource intensive, and different search techniques for OR-expansion should be considered. Apart from the exhaustive search strategy, two-pass, linear, and greedy search strategies may also be considered for cost-based OR-expansion.

The number of ways of partitioning a set of N elements into k nonempty sets is given by Stirling numbers of the second kind:

$$S(N, k) = \frac{1}{k!} \sum_{i=0,k} (-1)^i C_{k,i} (k-i)^N \quad \text{Equation 1}$$

Where $C_{k,i}$ is a binomial coefficient.

The total number of states of N disjunctive predicates is, therefore, a summation over S (N, k), where k ranges from 1 to N.

The number of ways of partitioning (i.e., states) a set of cardinality N is shown below. Below, the parenthesis shows a summation of partitions when k ranges from 1 to N.
N=1: (1)=1
N=2: (1+1)=2
N=3: (1+3+1)=5
N=4: (1+7+6+1)=15
N=5: (1+15+25+10+1)=52
N=6: (1+31+90+65+15+1)=203

The enumeration of exhaustive states for OR-expansion can use the well-known algorithms for set partitioning.

Exhaustive Search

In one embodiment, the query processor selects an exhaustive search procedure as the certain procedure. For the exhaustive search procedure, the query processor generates semantically equivalent candidate queries that cover all possible combinations of two or more subqueries that are based on the two or more certain disjunctive predicates. The candidate queries may include one or more UNION ALL operators.

Given a query with four disjunctive predicates in a fully un-nested state, such as a disjunctive combination of four conjunctive combinations of predicates (for example, C1 V C2 V C3 V C4, where each of C1, C2, C3, and C4 are conjunctive combinations of predicates), the problem of exhaustive enumeration of OR-expansion states neatly turns into the well-known set partitioning problem. In the above example, the cardinality of the set is (N=) 4.

In the example, there is 1 way the given set can be partitioned into 1 subset:
S1: [{C1 V C2 V C3 V C4}]
this represents the no OR-expansion state.

There are 7 ways the given set can be partitioned into 2 subsets:
S2: [{C1 V C2}; {C3, C4}],
S3: [{C1 V C3}; {C2 V C4}],
S4: [{C1 V C4}; {C2 V C3}],
S5: [{C1 V C2 V C3}; {C4}],
S6: [{C1 V C2 V C4}; {C3}],
S7: [{C1 V C3 V C4}; {C2}],
S8: [{C2 V C3 V C4}; {C1}]

Here a semi-colon (;) represents a UNION ALL operation. For example, the state S4 represents the query:
(SELECT . . . FROM . . . WHERE C1 OR C4)
UNION ALL
(SELECT . . . FROM . . . WHERE (C2 OR C3) AND NOT (C1 OR C4)).
In the example, C1 OR C4 is negated to preserve semantic equivalence to an initial query:
SELECT . . . FROM . . . WHERE C1 OR C2 OR C3 OR C4.

Returning to the example, there are 6 ways the given set can be partitioned into 3 subsets:
S9: [{C1 V C2}; {C3}; {C4}],
S10: [{C1 V C3}; {C2}; {C4}],
S11: [{C1 V C4}; {C2}; {C3}],
S12: [{C2 V C3}; {C1}; {C4}],
S13: [{C3 V C4}; {C1}; {C2}],
S14: [{C2 V C4}; {C1}; {C3}]

There is 1 way the given set can be partitioned into (n=) 4 subsets:
S15: [{C1}; {C2}; {C3}; {C4}]

The above state represents the query:
(SELECT . . . FROM . . . WHERE C1)
UNION ALL
(SELECT . . . FROM . . . WHERE C2)
UNION ALL
(SELECT . . . FROM . . . WHERE C3)
UNION ALL
(SELECT . . . FROM . . . WHERE C4)

Therefore, for a set of cardinality 4, the size of the exhaustive state space is 1+7+6+1 or 15. In other words, there are 15 OR-expansion states that may be explored using exhaustive search for a query with four disjunctive predicates in the fully un-nested form. For a set of cardinality N, the size of the exhaustive state space is given by Equation 1. Exploring these states consumes resources such as processor time. Therefore, as the number of disjunctive predicates increases, the state space becomes so large for exhaustive search that exhaustive search may become less and less practical. On the other hand, without knowing more about the query, exhaustive search is the only technique that is guaranteed to find the minimum cost expansion state.

Two-Pass Search

In one embodiment, the query processor selects a two-pass search procedure as the certain procedure. For the two-pass search procedure, the query processor generates a single semantically equivalent query that expands all of the disjunctive predicates into subqueries. The subqueries are combined using UNION ALL operator(s).

The two-pass search strategy considers only two states, namely, "No Transformation" (NT) state and "Full Or Expansion" (FORE) state. The NT state is the initial state when OR expansion transformation is not applied on the query. FORE represent the state where all the disjunctive predicates in the fully un-nested representation of the query are transformed into UNION ALL branches.

In one example, the following disjunctive predicate chain: a=1 V b=2 V c=3 may be represented as A V B V C, where A≡a=1; B≡b=2; C≡c=3. This representation is referred to as a disjunctive normal form of the predicate chain. In the example, A V B V C is the same as C1 V C2 V C3 or OR(C1, C2, C3).

The two pass enumeration of C1, C2 and C3 gives following states:
State#1 (NT state): [{C1 V C2 V C3}]
The SQL representation of the NT state is:
SELECT . . . FROM . . . WHERE C1 OR C2 OR C3
State#2 (FORE state): [{C1}; 1C2; C3]
The SQL representation of the FORE state is:
(SELECT . . . FROM . . . WHERE C1)
UNION ALL
(SELECT . . . FROM . . . WHERE C2)
UNION ALL
(SELECT . . . FROM . . . WHERE C3)

Therefore, for a set of any cardinality, the size of the two-pass state space is 2. In other words, there are 2 OR-expansion states, including the no transformation state, that may be explored using the two-pass strategy, regardless of how many disjunctive predicates are in the query. Exploring these two states is predictably inexpensive in terms of consumed resources. Therefore, as the number of disjunctive predicates increases, the two-pass search strategy remains an efficient strategy for finding one transformation in addition to the no transformation state. On the other hand, because the two-pass technique only explores two possible states, without knowing more about the query, the two-pass strategy is relatively unlikely to find the minimum cost expansion state.

Linear Search

In one embodiment, the query processor selects a linear search procedure as the certain procedure. For the linear search procedure, the query processor may generate semantically equivalent candidate queries at least in part by expanding consecutive disjunctive predicates in the certain query, representing the NT state. Alternatively, for the linear search procedure, the query processor may generate semantically equivalent candidate queries at least in part by expanding all of the disjunctive predicates into subqueries into a first query, representing the FORE state, and fusing consecutive subqueries of the first query to generate one or more other queries.

Linear search explores n+2 states, where the total number of disjunctive predicates in fully un-nested form is
N: $\{C1, C2, C3, \ldots C_i, \ldots C_n\}$.

The linear search procedure starts with two initial states NT (S1) and FORE (S2). State S1 is associated with an operator expand and state S2 is associated with operator fuse. Given a conjunction $C_1$, and a state $S_i$, the expand operation removes $C_i$, from the disjunction for which it appears in $S_i$, and generates a UNION ALL branch for Ci to form next state $S_{i+1}$. Given a conjunction $C_1$, and a state $S_i$, the fuse operation combines $C_i$, with the element to its left neighbor, $C_j$, in $S_i$, by OR-ing $C_i$, with $C_j$ into a same UNION ALL branch to form next state $S_{i+1}$.

In the linear search procedure:
the operation associated with a state S is used to derive other states from it;
a state inherits its operation from the state it is derived from;
a next state $S_k$ is derived from the best state so far; and
the cost of state $S_{n+2}$ is not evaluated, if it is the same as either S1 or S2.

Under this strategy the Cost Based transformation framework starts with two initial states NT and FORE and based on the chosen state it generates next state.

Under the linear strategy, the query processor generates the first state, which is the no transformation (NT) state. This state is associated with the expand operation.
$S1=[\{C1, C2, C3, \ldots C_i, \ldots C_n\}]$ The query processor also generates the Full OR Expansion (FORE) state. This state is associated with the fuse operation.
$S2=[\{C1\}; \{C2\}; \{C3\}; \ldots \{C_i\}; \ldots \{C_n\}]$ The linear strategy then finds the best state (BS) (from those among the states considered for the linear strategy) using cost function C.

The query processor compares the cost of the NT state (C(S1)) with the cost of the FORE state (C(S2)). The least cost state is selected as the best state so far. For example, if C(S2)<C(S1) then BS=S2; else BS=S1.

If the best state is associated with the expand operation, then iteratively for k from 1 to n, the query processor generates the next state, $S_k$, by applying the expand operator on $C_k$ in $S_{k-1}$. The query processor updates the best state by comparing the costs of the current state and the best state so far.
$S_{k-1}=[\{C1\}; \{C2\}; \ldots \{C_{k-1}\}; \{C_k, \ldots C_n\}]$
$S_k=[\{C1\}; \{C2\}; \ldots \{C_{k-1}\}; \{C_k\}; \{C_{k+1}, \ldots C_n\}]$ If the best state is associated with the fuse operation, then iteratively for k from n-1 to 1, the query processor generates the next state, $S_k$, by fusing $C_k$ in $S_{k-1}$ with an element to its right.
$S_{k-1}=[\{C1\}; \{C2\}; \ldots \{C_k\}; \{C_{k+1}, \ldots, C_n\}]$
$S_k=[\{C1\}; \{C2\}; \ldots \{C_{k-1}\}; \{C_k, \ldots, C_n\}]$ Consider following disjunctive predicate chain: a=1 V b=2 V c=3. The formula can be written in DNF as A V B V C, where A≡a=1; B≡b=2; C≡c=3. In the example, let C1≡A; C2≡B; C3≡C. Now we have: A V B V C≡{C1 V C2 V C3}≡OR(C1, C2, C3).

The linear search starts with following two states:
State#1 (NT state): [{C1 V C2 V C3}]
State#2 (FORE state): [{C1}; {C2}; {C3}]

If the best of these two initial states is the NT state (i.e., C(S1)<C(S2)), then the query processor may follow this iterative EXPAND procedure to generate and cost states S3, S4, and S5:
Say C(S1) <C(S2)
=>BS=S1=> expand C1 to generate
S3=[{C1}; {C2 V C3}]
Compare C(S3) to C(BS)
Say C(S3)>C(BS)
=>BS=S1=> expand C2 to generate
S4=[{C2}; {C1 V C3}]
Compare C(S4) to C(BS)
Say C(S4)>C(BS)
=>BS=S1=> expand C3 to generate
S5=[{C3}; {C1 V C2}]
Compare C(S4) to C(BS)
Say C(S5)<C(BS)
=>BS=S5

If the best of the two initial states is the FORE state (i.e., C(S1)>C(S2)), then the query processor may follow this iterative FUSE process to generate and cost states S3, S4, and S5:
Say C(S1)>C(S2)
=>BS=S2=> fuse C2 to generate
S3=[{C1}; {C2 V C3}]
Compare C(S3) to C(BS)
Say C(S3)>C(BS)
=>BS=S2=> fuse C1 to generate
S4=[{C1 V C2}; {C3}]
Compare C(S4) to C(BS)
Say C(S4)<C(BS)
=>BS=S4

In the example, according to the linear procedure, the query processor may continue expanding until it reaches the FORE state, or may continue fusing until it reaches the NT state. Alternatively, the query processor may continue expanding or fusing until:
the query processor finds a best state that is not the NT or the FORE state;
the query processor has attempted M consecutive transformations without finding a better state, where 1<M<N;

the query processor has attempted M total transformations, where 1<M<N, in which case the size of the linear state space is at most M+2; otherwise, the size of the linear state space is at most N+2.

Therefore, for a set of cardinality N, the size of the linear state space is at most N+2. Exploring these N+2 states may consume more resources than the two-pass search strategy but fewer resources than the exhaustive search strategy. Therefore, as the number of disjunctive predicates increases, the linear search strategy gets more efficient as compared to the exhaustive strategy but less efficient as compared to the two-pass strategy. Without knowing more about the query, unlike the exhaustive strategy, the linear strategy is not guaranteed to find the minimum cost expansion state; however, the linear strategy is more likely to find the minimum cost expansion state than is the two-pass strategy.

Greedy Search

In one embodiment, the query processor selects a greedy search procedure as the certain procedure. For the greedy search procedure, the query processor may initially generate the NT state and the FORE state. Upon determining that the NT state costs less than the FORE state, the query processor may generate semantically equivalent candidate queries at least in part by expanding consecutive disjunctive predicates in the certain query, representing the NT state. Alternatively, for the linear search procedure, the query processor may generate a semantically equivalent candidate query that represents the FORE state, and, upon determining that the FORE state costs less than the NT state, no other candidate queries.

Unlike the linear search procedure, the greedy search procedure may keep the FORE state as the best state without iteratively performing fuse operations to test other states. In other words, the greedy algorithm is a variant of Linear search strategy with a single expand operator.

This greedy search will at most explore n+1 states, where the total number of disjunctive predicates in fully un-nested form is:
N: {C1, C2, C3, . . . $C_i$, . . . $C_n$}.

According to the greedy search procedure, the query processor may start with two initial states: NT (S1) and FORE (S2). State S1 is associated with expand operator. Given a conjunction $C_i$, and a state $S_i$, the expand operation removes $C_i$, from the disjunction it appears in $S_i$, and generates a UNION ALL branch for $C_i$, to form next state $S_{i+1}$. A next state $S_k$ is derived from the best state so far.

The NT state is associated with the operation expand.
S1=[{C1, C2, C3, . . . $C_i$, . . . $C_n$}]
The query processor also determines the FORE state.
S2=[{C1}; {C2}; {C3}; . . . {$C_i$;} . . . {$C_n$}]
The query processor then finds the best state (BS) using cost function C. For example, if C(S2)<C(S1) then BS=S2; else BS=S1.

If the best state is FORE, then no further states are generated. State S2 is chosen as final OR-expansion state for the initial query.

If the best state is S1, then for k from 1 to n−1, the query processor generates the next state incrementally by applying expand operator on $C_k$ in $S_{k-1}$. The query processor then updates the best state by comparing the costs of the current state and the best state so far.
$S_{k-1}$=[{C1}; {C2}; . . . {$C_{k-1}$}; {$C_k$, . . . $C_n$}]
$S_k$=[{C1}; {C2}; . . . {$C_{k-1}$}; {$C_k$}; {$C_{k+1}$, . . . $C_n$}]
The following heuristics may be applied for pruning search space:

If FORE is better than NT state, then the greedy search is aborted and FORE is the final state.

If S1 is chosen then the greedy search generates incremental states and aborts the search when the cost of a state becomes worse than the best cost.

For example, Consider following disjunctive predicate chain: (a=1 V b=2) ∧ (c=3 V d=4). Let A≡a=1; B≡b=2; C≡c=3; D≡d=4. Here A, B, C and D are atomic formulas. The given formula can now be written as: (A V B) ∧ (C V D). The given formula is converted into DNF as OR(C1, C2, C3, C4) because (A V B) ∧ (C V D) ≡(A ∧ C) V (A ∧ D) V (B ∧ C) V (B ∧ D) ≡{C1 V C2 V C3 V C4}≡OR(C1, C2, C3, C4)

The greedy search starts with following two states:
State#1 (NT state): [{C1 V C2 V C3 V C4}]
State#2 (FORE state): [{C1}; {C2}; {C3}; {C4}]
Upon comparing the NT state to the FORE state, if the NT state is better, then, according to the greedy search technique, the query processor may proceed with the following EXPAND process.
Say C(S1)<C(S2)
=>BS=S1=> expand C1 to generate
S3=[{C1}; {C2 V C3 V C4}]
Compare C(S3) to C(BS)
Say C(S3)<C(BS)
=>BS=S3=> expand C2 to generate
S4=[{C1}; {C2}; {C3 V C4}]
Compare C(S4) to C(BS)
Say C(S4)>C(BS)
=>BS=S3 and stop Therefore, for a set of cardinality N, the size of the greedy state space is at most N+1. Exploring these N+1 states may consume, on average, fewer resources than the linear search strategy but more resources than the two-pass search strategy. Therefore, as the number of disjunctive predicates increases, the greedy search strategy gets more efficient as compared to the linear search strategy but less efficient as compared to the two-pass strategy. Without knowing more about the query, unlike the exhaustive strategy, the greedy strategy is not guaranteed to find the minimum cost expansion state; however, the greedy strategy is, on average, less likely to find the minimum cost expansion state than is the linear strategy but more likely to find the minimum cost expansion state than is the two-pass strategy.

Example Control Parameters

Control parameter(s) are provided or sent to the query processor, for example, as input via an application or user interface, by default, or via shared storage. For example, a user may specify which technique should be applied to which query or group of queries. In another example, an application may specify which technique should be applied to which query or group of queries. The control parameter may be provided separately from a query to be processed or analyzed by the query processor. In one example, the control parameter is a session parameter for a session in which the query is received. The session parameter may be set by the query or another command sent by an application or user in the session, set by default, or set by an application or user using shared storage. For example, a session parameter may be set by changing the value of a stored variable named "OR-EXPANSION-STRATEGY" to a value such as "ON," "EXHAUSTIVE," "TWO-PASS," "LINEAR," "GREEDY," or "OFF." These are example values, and any information could be used to identify certain OR-expansion techniques. The stored variable and value combination indicate which technique of multiple available techniques may be used to explore OR-expansion states for the query and optionally for other queries until the parameter is changed. Note that "OFF" may indicate that OR-expansion should not be performed, and "ON" may indicate that the query processor automatically chooses one of the available techniques.

In another example, the control parameter is a hint that is embedded in an expression that is or includes the query. For example, the hint may be specified using a hint-like syntax that separates the hint from the query. A hint-like syntax marks the hint using unique characters such as /*. The hint may also have other information that distinguishes the hint from other hints or non-hints (for example, comments for the user rather than hints for the query processor). An example hint may identify an OR-expansion technique control parameter using the "OR-EXPANSION-STRATEGY" keyword, and assigning a value such as "ON," "EXHAUSTIVE," "TWO-PASS," "LINEAR," "GREEDY," or "OFF." The parameter's keyword and value combination indicate which technique of multiple available techniques may be used to explore OR-expansion states for the query and optionally for other queries until the parameter is changed.

Regardless of how the control parameter(s) are specified, the control parameters may indicate certain OR-expansion technique(s) that should be use to expand OR-expansion states of the query. The control parameter(s) may alternatively or additionally specify whether or not OR-expansion should be performed, and/or whether an OR-expansion technique should be selected automatically by the query processor.

An interface for setting the control parameter(s) may allow finer granularity controls over the OR-expansion technique to be applied. For example, the interface may allow the user to specify rules for applying different OR-expansion techniques in different scenarios. The control parameter may indicate that a first technique should be used for queries that have below a certain number of disjunctive predicates and/or above a certain number of disjunctive predicates. For example, a two-pass technique may be indicated, using the interface, for application to queries with more than 20 disjunctive predicates or fewer than 3 predicates, and a linear technique may be indicated, using the interface, for application to queries with less than 20 disjunctive predicates and more than 3 predicates.

In addition to triggering application of different techniques for different numbers of disjunctive predicates, the control parameters may trigger application of different techniques for, or otherwise based at least in part on:
- different estimated sizes of tables,
- different times of a day, week, month, or year, or other different temporal characteristics
- different applications or users originating the queries,
- different partitions or combinations of partitions that are accessed by the query,
- different tables, columns, or rows that are accessed by the query,
- different roles of users originating the queries, and/or
- different loads that are currently measured or estimated for query processors that search the OR-expansion state space or server(s) that may execute the query.

In one example, a hint-like syntax is specified as "/* OR-EXPANSION=LINEAR" to indicate that linear search should be used for an accompanying query or queries. In another example, a hint-like syntax is specified as "/* OR-EXPANSION=EXHAUSTIVE IF RECEIVE_TIME BETWEEN 12:00 a.m. AND 4:00 a.m. ELSE LINEAR */". The example hint indicates that the exhaustive technique is to be used of the query is received between 12:00 a.m. and 4:00 a.m. The user may specify this syntax with the query knowing that this time range is a down-time or time of low workload for a query processor that searches the OR-expansion state space, or a peak-time or time of high workload for the query processor. During the down-time or time of low workload, the query processor may have more resources available to complete the exhaustive search before the query is executed at a server.

Example Intermediate Transformations and Structures

In one embodiment, a received query is transformed into disjunctive normal form (DNF) before applying the OR-expansion technique specified by the control parameter. In disjunctive normal form, all conjunctions or individual predicates in a disjunction may be treated as separately identifiable units. For example, a simplified DNF for " . . . WHERE (lname="Smith" OR lname="Jones") AND age=30" is " . . . WHERE A OR B." In the example, A represents the conjunctive combination "lname="Smith" AND age=30," and B represents the conjunctive combination "lname="Jones" AND age=30."

Using the DNF allows the query processor to analyze the query and different possible OR-expansion states without storing and referencing the original expression that was identified as a separately identifiable unit. Instead, the item may be treated atomically as "A" or a first disjunctive predicate, even though the item may actually be a conjunctive combination of multiple predicates or just a single predicate.

In one embodiment, the disjunctive normal form of a query is stored as a matrix, and the matrix is used by the query processor and/or costing mechanism for generating and/or costing various states using a selected OR-expansion technique.

The matrix representation is used for predicates that have been converted into DNF. Any given formula can be converted into DNF using the rules of commutative, distributive, associativity, De Morgan, etc. This formalism also provides a compact and efficient ways representing DNF where many conjunctive predicates are duplicated in various disjunctions.

In one example, a query specifies the following predicates:

(a=1 $\vee$ b=2) $\wedge$ (c=3 $\vee$ d=5)

In the example, let P1≡a=1; P2≡b=2; P3≡c=3; P4≡d=5. Here P1, P2, P3, and P4 are atomic formulas. The given formula can now be written as:

(P1 $\vee$ P2) $\wedge$ (P3 $\vee$ P4)

The query processor may convert the given formula into DNF as shown below.

(P1 $\vee$ P2) $\wedge$ (P3 $\vee$ P4)=(P1 $\wedge$ P3) $\vee$ (P1 $\wedge$ P4) $\vee$ (P2 $\wedge$ P3) $\vee$ (P2 $\wedge$ P4)

In the example, let C1≡(P1 $\wedge$ P3); C2≡(P1 $\wedge$ P4); C3≡(P2 $\wedge$ P3); C4≡(P2 $\wedge$ P4).

Now, the atomic formulas are equivalent to a DNF specification.

(P1 $\wedge$ P3) $\vee$ (P1 $\wedge$ P4) $\vee$ (P2 $\wedge$ P3) $\vee$ (P2 $\wedge$ P4)
≡{C1 $\vee$ C2 $\vee$ C3 $\vee$ C4}
≡OR(C1, C2, C3, C4)

In the DNF specification:
C1 represents (a=1 $\wedge$ c=3),
C2 represents (a=1 $\wedge$ d=5),
C3 represents (b=2 $\wedge$ c=3), and
C4 represents (b=2 $\wedge$ d=5);

These conjunctions are represented as single units in DNF, and these single units may be represented as a matrix of M×N where the columns represent the predicates and the rows represent the conjunctions. In one embodiment, the query processor generates such a matrix from an accessed initial query or an intermediate DNF form of the initial query. The matrix associates individual predicates with corresponding conjunctions in which the individual predicates occur. If the individual predicate appears in a disjunction but is not conjoined to any other predicate, then the individual predicate may appear by itself as one of the conjunctions or may be omitted from the list of conjunctions and treated separately. The query processor may use the matrix to apply the selected OR-expansion technique, for example, by treating the query as a combination of generic conjunctions, performing OR-expansion on the generic conjunctions, and then mapping the generic conjunctions back to the original predicates using the matrix. An example matrix is provided below as Table 1.

TABLE 1

EXAMPLE DNF MATRIX

| | Predicates | | | |
|---|---|---|---|---|
| Conjunctions | a = 1 | b = 2 | c = 3 | d = 5 |
| C1 - (P1 ∧ P3) | 1 | 0 | 1 | 0 |
| C2 - (P1 ∧ P4) | 1 | 0 | 0 | 1 |
| C3 - (P2 ∧ P3) | 0 | 1 | 1 | 0 |
| C4 - (P2 ∧ P4) | 0 | 1 | 0 | 1 |

As shown, the first conjunction, C1, is a=1 AND c=3, as determined from the columns in the DNF matrix that have been marked as 1. This conjunction is OR-ed with the other conjunctions, C2, C3, and C4, each of which includes an AND-ed combination of a subset of the predicates.

Based on the DNF matrix, the query processor may explore a variety of states without replicating the predicates. The different states may be represented by different combinations of conjunctions, which are merely rows in the matrix. Further, in order to determine which predicates map to the conjunctions, the query processor may access the individual bits stored in the columns that represent the individual predicates. Using a DNF matrix or another compact representation may save memory and processing time for the query processor.

Automatic Selection of OR-Expansion Technique

In one embodiment, the query processor receives a certain query comprising disjunctive predicates, and the query processor automatically selects a certain procedure of a plurality of alternative procedures for expanding queries comprising disjunctive predicates into semantically equivalent candidate queries comprising combinations of subqueries. The query processor may then apply the certain procedure to expand the certain query into a semantically equivalent candidate query or queries. Each of the semantically equivalent candidate queries comprises a different combination of subqueries. The query processor may then cause cost-based evaluation of the certain query and each of the semantically equivalent candidate queries. Based at least in part on the cost-based evaluation, the query processor may then select a query of the semantically equivalent candidate queries or the certain query for execution or further cost-based evaluation, analysis, or transformation.

The automatic selection may be based on a variety of factors, collectively referred to as the context for selection, including any criteria that could be used for the triggers that would alternatively be specified by control parameters. For the automatic selection, the control parameters may be hard-coded and applied by the query processor on a query-by-query basis according to the control parameters. For example, one OR-expansion technique may be a default technique, and the query processor may store rules that define scenarios where non-default techniques should be applied. For example, a default technique could be LINEAR. The rules may specify that EXHAUSTIVE is to be applied when there are 5 or fewer disjunctive units in the query, GREEDY when there are between 15 and 20 disjunctive units, and TWO-PASS when there are more than 20 disjunctive units.

The rules may be specified based on which technique is predicted to provide the best cost-benefit tradeoff for a given scenario. For example, exploring a high percentage (or all) of OR-expansion states has a better cost-benefit tradeoff, on average, when there are fewer OR-expansion states to explore (i.e., fewer disjunctive units in the query), but exploring the high percentage (or all) of OR-expansion states can become prohibitively expensive when there are a massive number of OR-expansion states to explore (i.e., a high number of disjunctive units in the query). Conversely, exploring a low percentage (or a fixed number) of OR-expansion states has a better cost-benefit tradeoff, on average, when there are more OR-expansion states to explore, but exploring the low percentage (or a fixed number) of OR-expansion state can have prohibitively poor performance in finding the optimal state when there are fewer OR-expansion states to explore.

In one embodiment, the query processor may choose exhaustive search for queries or subqueries that are predicted to occur again or to occur frequently. The query processor may keep track of how frequently different queries and subqueries occur, and the prediction may be made based on this tracked information. If a query or subquery is predicted to re-occur, then finding the best expected OR-expansion state for that query yields a greater benefit. This greater benefit may balance out the higher cost of techniques that explore more OR-expansion states, such as exhaustive search. Therefore, the query processor may select these techniques that explore more OR-expansion states for re-used queries or subqueries.

Join Factorization

In one embodiment, although the "initial query," as referred to herein, may be the no transformation or no expansion state, the initial query may alternatively be transformed from another query that has already been at least partially expanded or otherwise includes one or more UNION ALL operators or the equivalent. Join factorization techniques may be used to factor out common table(s) in subqueries that are connected as separate branches of UNION ALL operators and that reference the same source tables into a single query that contains disjunctive units of predicates that correspond to the predicates of the initial subqueries.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
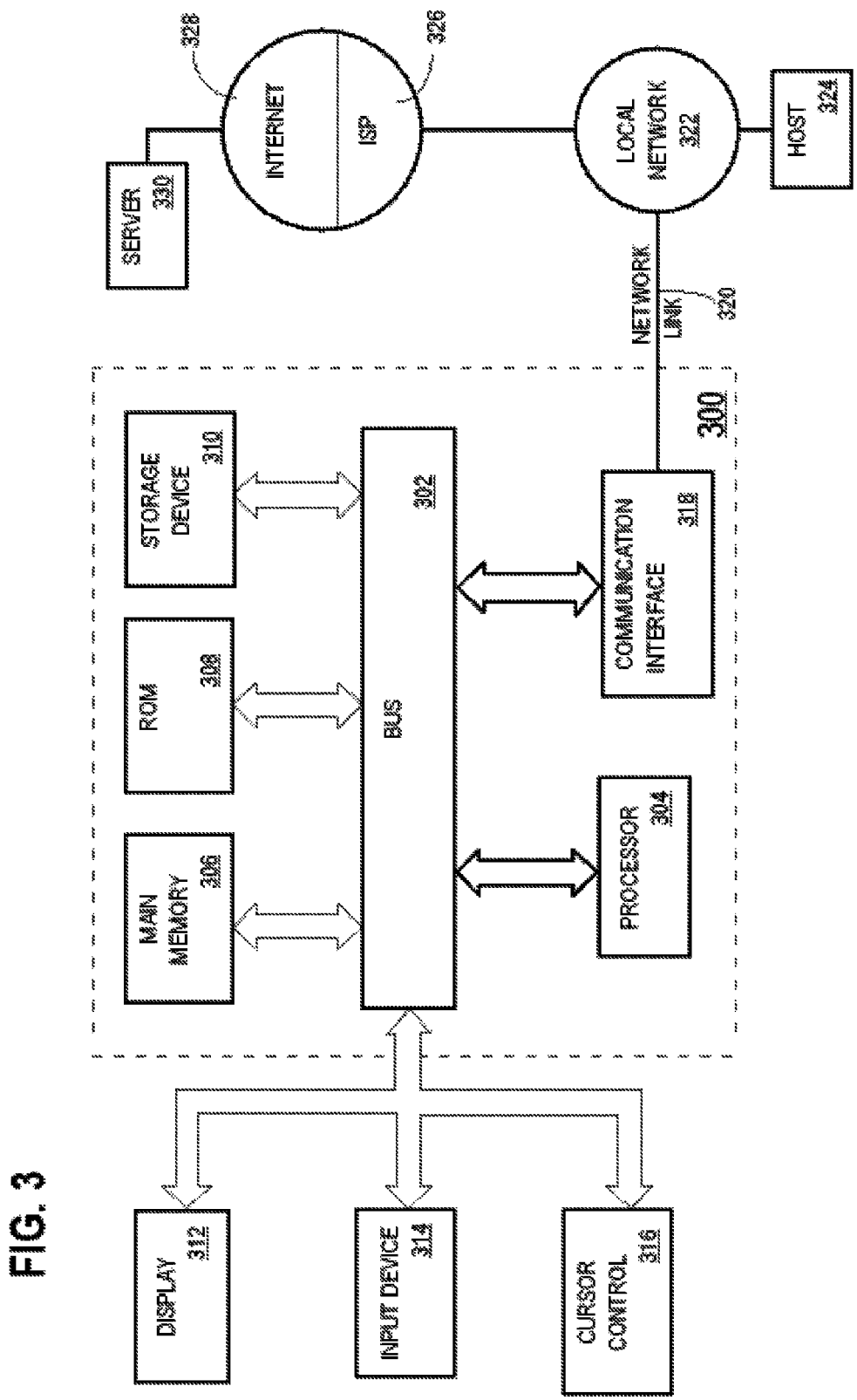
FIG. 3 illustrates an example computer system for performing various combinations of steps described herein.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a light emitting diode (LED) display, for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
accessing a query comprising a plurality of predicates that includes two or more predicates in disjunction;
selecting, based on a number of predicates in said two or more predicates in disjunction, from a plurality of alternative stored procedures, a certain procedure to expand the query into one or more semantically equivalent candidate queries;
wherein the plurality of alternative stored procedures each generate a different set of semantically equivalent candidate queries from an expansion state space of the query that includes all possible semantically equivalent queries comprising two or more conjunctive subqueries combined by one or more UNION ALL operators, each conjunctive subquery of the two or more conjunctive subqueries including one or more predicates of the plurality of predicates, in conjunction, said two or more conjunctive subqueries include a first conjunctive query that includes a particular predicate of said two or more predicates and a second conjunctive subquery that includes another of said two or more predicate but not said particular predicate;
based on the certain procedure selected, generating one or more semantically equivalent candidate queries;
performing a cost evaluation of the query and each of the one or more semantically equivalent candidate queries;
based at least in part on the cost evaluation, selecting a particular query of the one or more semantically equivalent candidate queries or the query;
causing execution of a transformed query that is based at least in part on the particular query;
wherein the method is performed by one or more processors of one or more computing devices.

2. The method of claim 1, wherein the plurality of alternative stored procedures include two or more of an exhaustive search procedure, a two-pass search procedure, a linear search procedure, or a greedy search procedure.

3. The method of claim 1, wherein the certain procedure comprises an exhaustive search procedure, and wherein generating the one or more semantically equivalent candidate queries comprises generating all possible semantically equivalent queries comprising two or more conjunctive subqueries combined by one or more UNION ALL operators.

4. The method of claim 1, wherein the certain procedure comprises a two-pass search procedure, and wherein generating the one or more semantically equivalent candidate queries comprises generating a single query that expands all of the two or more predicates in disjunction into subqueries combined by one or more UNION ALL operators.

5. The method of claim 1, wherein the certain procedure comprises a linear search procedure, and wherein generating the one or more semantically equivalent candidate queries comprises expanding consecutive disjunctive predicates into conjunctive subqueries combined by one or more UNION ALL operators.

6. The method of claim 1, wherein the certain procedure comprises a linear search procedure, and wherein generating the one or more semantically equivalent candidate queries comprises generating:
a first query that expands all of the two or more predicates in disjunction into conjunctive subqueries combined by one or more UNION ALL operators, and
one or more other queries that are based at least in part on fused consecutive conjunctive subqueries of the first query combined by one or more UNION ALL operators.

7. The method of claim 1,
wherein the certain procedure comprises a greedy search procedure,
wherein generating the one or more semantically equivalent candidate queries comprises:
generating a first query that expands all of the two or more predicates in disjunction into conjunctive subqueries combined by one or more UNION ALL operators,
generating a second query that is based at least in part on fused consecutive conjunctive subqueries of the first query combined by one or more UNION ALL operators, and
based at least in part on determining that the second query has an estimated cost that is less than the first query, generating one or more other queries that are based at least in part on fused consecutive conjunctive subqueries of the second query.

8. The method of claim 1,
wherein the certain procedure comprises a greedy search procedure,
wherein generating the one or more semantically equivalent candidate queries comprises:
generating a first query that expands all of the two or more predicates in disjunction into conjunctive subqueries combined by one or more UNION ALL operators, and
based at least in part on determining that the first query has an estimated cost that is less than an estimated cost of the query, generating no other queries.

9. The method of claim 1, further comprising converting the query to disjunctive normal form before applying the certain procedure.

10. The method of claim 1,
wherein performing the cost evaluation of the query and each of the one or more semantically equivalent candidate queries comprises estimating a cost of the query and estimating a cost for each of the one or more semantically equivalent candidate queries;
wherein the particular query selected is a lowest cost query of the query and the one or more semantically equivalent candidate queries.

11. The method of claim 1, further comprising:
generating a matrix based on the query, wherein the matrix associates individual predicates of the plurality of predicates of the query with corresponding conjunctive subqueries in which the individual predicates occur; and
using the matrix when applying the certain procedure to expand the query into the one or more semantically equivalent candidate queries.

12. The method of claim 1, further comprising:
accessing a control parameter that indicates a particular procedure of the plurality of alternative stored procedures;
wherein the selecting the certain procedure is based at least in part on the particular procedure.

13. The method of claim 12, wherein the control parameter is a session parameter for a session in which the query is received.

14. The method of claim 12, wherein the control parameter is a hint that is embedded in an expression comprising the query.

15. One or more non-transitory computer-readable storage media storing instructions which, when executed, cause:
accessing a query comprising a plurality of predicates that includes two or more predicates, in disjunction;
selecting, based on a number of predicates in said two or more predicates in disjunction, from a plurality of alternative stored procedures, a certain procedure to expand the query into one or more semantically equivalent candidate queries;
wherein the plurality of alternative stored procedures each generate a different set of semantically equivalent candidate queries from an expansion state space of the query that includes all possible semantically equivalent queries comprising two or more conjunctive subqueries combined by one or more UNION ALL operators, each conjunctive subquery of the two or more conjunctive subqueries including one or more predicates of the plurality of predicates, in conjunction,
said two or more conjunctive subqueries include a first conjunctive query that includes a particular predicate of said two or more predicates and a second conjunctive subquery that includes another of said two or more predicate but not said particular predicate;
based on the certain procedure selected, generating one or more semantically equivalent candidate queries;
performing a cost evaluation of the query and each of the one or more semantically equivalent candidate queries;
based at least in part on the cost evaluation, selecting a particular query of the one or more semantically equivalent candidate queries or the query;
causing execution of a transformed query that is based at least in part on the particular query.

16. The one or more non-transitory computer-readable storage media of claim 15, wherein the plurality of alternative procedures include two or more of an exhaustive search procedure, a two-pass search procedure, a linear search procedure, or a greedy search procedure.

17. The one or more non-transitory computer-readable storage media of claim 15, wherein the certain procedure comprises an exhaustive search procedure, and wherein generating the one or more semantically equivalent candidate queries comprises generating all possible semantically equivalent queries comprising two or more conjunctive subqueries combined by one or more UNION ALL operators.

18. The one or more non-transitory computer-readable storage media of claim 15, wherein the certain procedure comprises a two-pass search procedure, and wherein generating the one or more semantically equivalent candidate queries comprises generating a single query that expands all of the two or more predicates in disjunction into subqueries combined by one or more UNION ALL operators.

19. The one or more non-transitory computer-readable storage media of claim 15, wherein the certain procedure comprises a linear search procedure, and wherein generating the one or more semantically equivalent candidate queries comprises expanding consecutive disjunctive predicates into conjunctive subqueries combined by one or more UNION ALL operators.

20. The one or more non-transitory computer-readable storage media of claim 15, wherein the certain procedure comprises a linear search procedure, and wherein generating the one or more semantically equivalent candidate queries comprises generating:
a first query that expands all of the two or more predicates in disjunction into conjunctive subqueries combined by one or more UNION ALL operators, and
one or more other queries that are based at least in part on fused consecutive conjunctive subqueries of the first query combined by one or more UNION ALL operators.

21. The one or more non-transitory computer-readable storage media of claim 15, wherein the certain procedure comprises a greedy search procedure, wherein generating the one or more semantically equivalent candidate queries comprises:
generating a first query that expands all of the two or more predicates in disjunction into conjunctive subqueries combined by one or more UNION ALL operators,
generating a second query that is based at least in part on fused consecutive conjunctive subqueries of the first query combined by one or more UNION ALL operators, and
based at least in part on determining that the second query has an estimated cost that is less than the first query, generating one or more other queries that are based at least in part on fused consecutive conjunctive subqueries of the second query.

22. The one or more non-transitory computer-readable storage media of claim 15, wherein the certain procedure comprises a greedy search procedure, and wherein generating the one or more semantically equivalent candidate queries comprises:
generating a first query that expands all of the two or more predicates in disjunction into conjunctive subqueries combined by one or more UNION ALL operators, and
based at least in part on determining that the first query has an estimated cost that is less than an estimated cost of the query, generating no other queries.

23. The one or more non-transitory computer-readable storage media of claim 15, wherein the control parameter is a session parameter for a session in which the query is received.

24. The one or more non-transitory computer-readable storage media of claim 23, wherein the control parameter is a hint that is embedded in an expression comprising the query.

25. The one or more non-transitory computer-readable storage media of claim 15, wherein the instructions, when executed, further cause converting the query to disjunctive normal form before applying the certain procedure.

26. The one or more non-transitory computer-readable storage media of claim 15,
- wherein performing the cost evaluation of the query and each of the one or more semantically equivalent candidate queries comprises: estimating a cost of the query and estimating a cost for each of the one or more semantically equivalent candidate queries;
- wherein the particular query selected is a lowest cost query of the query and the one or more semantically equivalent candidate queries.

27. The one or more non-transitory computer-readable storage media of claim 15, wherein the instructions, when executed, cause:
- generating a matrix based on the query, wherein the matrix associates individual predicates of the plurality of predicates of the query with corresponding conjunctive subqueries in which the individual predicates occur; and
- using the matrix when applying the certain procedure to expand the query into the one or more semantically equivalent candidate queries.

28. The one or more non-transitory computer-readable storage media of claim 23, wherein the instructions, when executed, cause:
- accessing a control parameter that indicates a particular procedure of the plurality of alternative stored procedures;
- wherein the selecting the certain procedure is based at least in part on the particular procedure.

\* \* \* \* \*